United States Patent
Kaatz

[11] 3,908,909
[45] Sept. 30, 1975

[54] ANCHORING DEVICE FOR A FLEXIBLE SPRINKLER HOSE

[76] Inventor: Robert H. Kaatz, 6505 Parkwood Rd., Minneapolis, Minn. 55436

[22] Filed: Apr. 19, 1974

[21] Appl. No.: 462,216

[52] U.S. Cl............ 239/276; 24/16 PB; 248/74 PB; 248/87
[51] Int. Cl.² ........................................ B05B 15/06
[58] Field of Search ............. 248/75, 76, 77, 78, 79, 248/80, 81, 82, 83, 84, 85, 86, 87, 88, 156, 74 PB; 24/16 PB; 239/269, 276, 285

[56] References Cited
UNITED STATES PATENTS

| | | | |
|---|---|---|---|
| 561,286 | 6/1896 | Shild | 248/87 X |
| 619,647 | 2/1899 | Wetherby | 239/276 X |
| 860,054 | 7/1907 | Pecover | 239/276 |
| 994,005 | 5/1911 | Jones | 248/156 X |
| 1,479,943 | 1/1924 | Thompson | 248/88 |
| 1,480,982 | 1/1924 | Beard | 248/87 |
| 1,566,232 | 12/1925 | Schreiter | 248/87 |
| 2,025,895 | 12/1935 | Praeger | 248/84 |
| 2,484,794 | 10/1949 | Reuter | 248/87 X |
| 3,091,401 | 5/1963 | Hruby | 239/276 |
| 3,275,969 | 9/1966 | Sheeran | 248/74 PB X |
| 3,315,324 | 4/1967 | Ward | 24/16 PB X |
| 3,475,716 | 10/1969 | Laig | 24/16 PB X |
| 3,529,795 | 9/1970 | Van Niel | 248/74 PB X |
| 3,840,203 | 10/1974 | Sheehy | 248/156 X |

Primary Examiner—Roy D. Frazier
Assistant Examiner—Thomas J. Holko
Attorney, Agent, or Firm—Morsbach & Pillote

[57] ABSTRACT

An anchoring device for a flexible sprinkler hose formed of a one-piece body of resilient plastic material having an elongated intermediate body portion adapted to extend lengthwise of the hose in underlying relation thereto, an elongated anchor pin portion connected at one end of the intermediate body portion by an integral plastic hinge extending transverse to the anchor pin portion to allow swinging of the anchor pin portion from a position extending generally lengthwise of the hose to a position extending transverse to the hose, and a hose engaging portion integral with the intermediate body portion adjacent its other end and extending crosswise of the intermediate body portion to encircle a flexible sprinkler hose and attach the anchoring device thereto.

10 Claims, 7 Drawing Figures

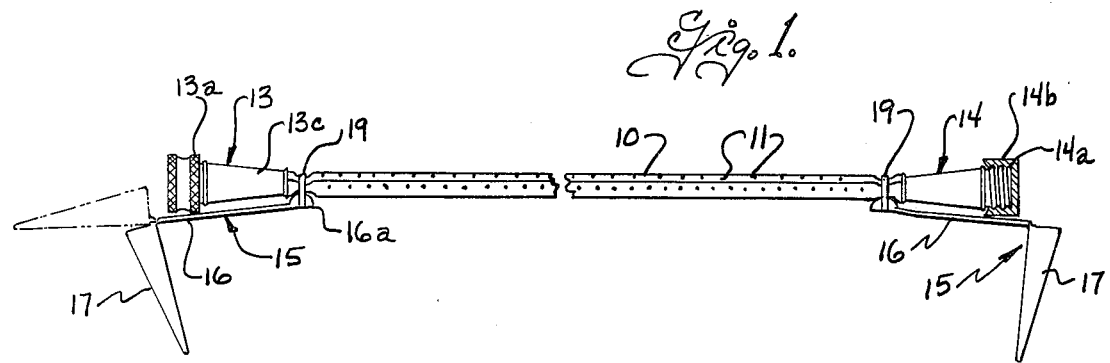
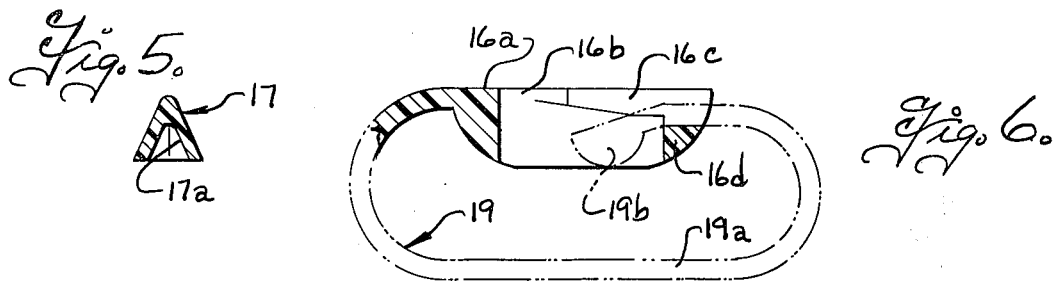
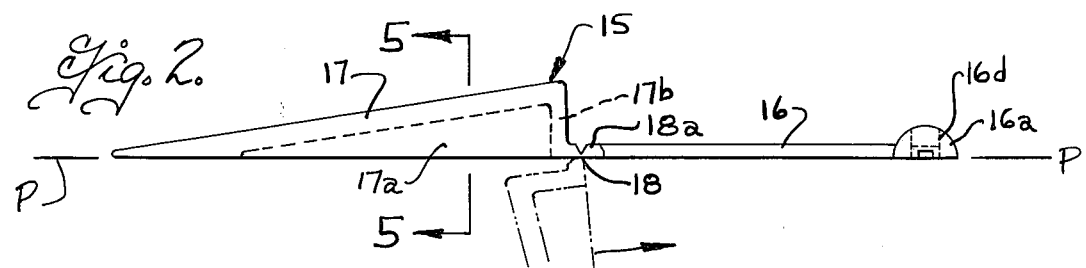
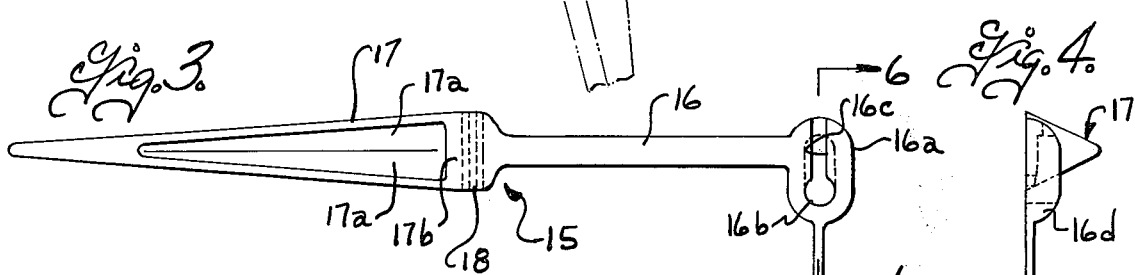
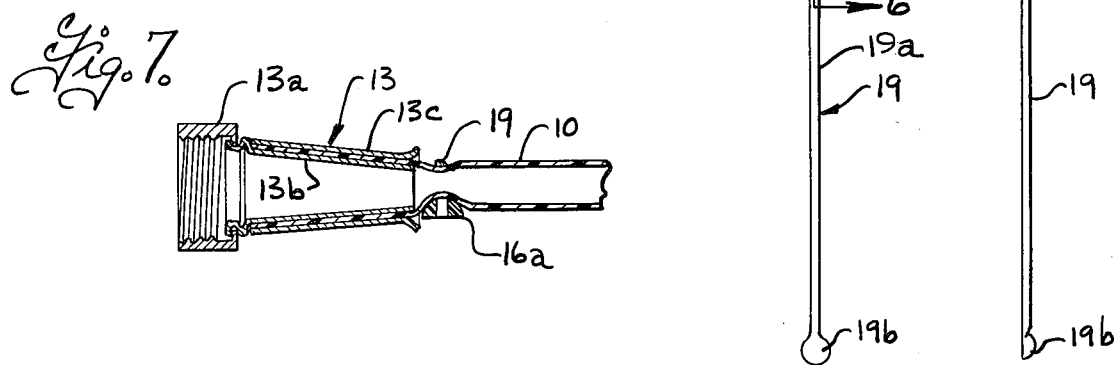

ANCHORING DEVICE FOR A FLEXIBLE SPRINKLER HOSE

BACKGROUND OF THE INVENTION

The present invention relates to improvements in anchoring devices for a flexible sprinkler hose. Such flexible sprinkler hoses are formed of a flexible material such as plastic and have rows of small perforations or holes along one side for emitting water in a multiplicity of fine streams along the length of the sprinkler hose. The sprinkler hose has a fitting at one end for connecting the sprinkler hose to a conventional garden hose and a fitting at the other end for closing the end of the sprinkler hose. Some difficulties are encountered in laying the sprinkler hose with the perforate side facing upwardly, particularly if the hose is cold or if the hose has been folded or kinked and, moreover, the portion of the hose will sometimes turn or shift when the water pressure is turned on.

In order to facilitate laying of flexible sprinkler hoses, it is heretofore been proposed, for example as shown in U.S. Pat. Nos. 2,757,962; 2,954,194; and 3,091,401 to provide rigid sprinkler hose anchoring devices in which the ground engaging stake was rigidly interconnected with the hose engaging portion so that the stake extends transversed to the hose at all times. With this arrangement, the stake impedes movement of the sprinkler hose from one location to the other by dragging over the ground and, moreover, inhibits compact storage of the sprinkler hose if the entering device is left attached to the sprinkler hose. Various different arrangements have also been proposed for supporting the anchoring stake for swinging movement relative to the hose engaging portion, for example as shown in U.S. Pat. Nos. 1,659,470 and 3,195,818. In the latter devices, the stake or pin was formed separate from the hose engaging portion and pivotally interconnected connected by a pin or swivel connection to the hose engaging portion. In general, these devices require multiple operations to make and assembly the several part one-piece sprinkler hose anchoring devices.

SUMMARY OF THE INVENTION

It is a general object of the present invention to provide an anchoring device for a flexible sprinkler hose in which the anchor pin is swingable between an anchoring position extending transversed to the hose and a storage or transport position in which the anchor pin extends lengthwise of the hose, and which anchoring device can be economically formed and easily applied to a flexible sprinkler hose.

The anchoring device for a flexible sprinkler hose of the present invention comprises a one-piece body of resilient plastic material having an intermediate body portion adapted to underly the hose, an elongated anchor pin portion integrally connected at one end to the intermediate body portion by a thin flexible connector forming a hinge that extends transversed to the anchor pin portion to allow swinging of the anchor pin portion between a position extending lengthwise of the hose on a position extending transversed to the hose, and a hose engaging portion integral with the intermediate body portion and adapted to at least partially encircle the flexible sprinkler hose for attaching the anchoring device thereto. The complete anchoring device can thus be formed in a simple molding operation to avoid the separate operation to form and assemble the anchor pin, hinge and hose clamp.

The intermediate body portion is preferably formed of the length between the hose engaging portion and the hinge greater than the length of the end fitting on the sprinkler hose so that the anchor pin portion is located beyond the end of the sprinkler hose when the anchoring device is attached to the hose. The anchor pin portion is advantageously formed with a channel shaped cross-section which not only longitudinally rigidifies the anchor pin but also improves anchoring in soft ground. The hose engaging portion is advantageously in the form of a flexible strap which extends laterally of the intermediate portion and is bendable to encircle the sprinkler hose and which has a snap lock arrangement for connecting the free end of the strap to the intermediate body portion to retain the strap in its hose encircling portion.

These, together with other objects and advantages of this invention will become more readily understood by reference to the following detailed description when taken into connection with the accompanying drawings wherein:

FIG. 1 is a fragmentary side elevational view of a flexible sprinkler hose having the anchoring device of the present invention applied thereto;

FIG. 2 is a side elevational view of the anchoring device on a larger scale than FIG. 1;

FIG. 3 is a plan view of the anchoring device on the same scale as FIG. 2;

FIG. 4 is an end view of the anchoring device on the same scale as FIG. 3;

FIG. 5 is a tranversed sectional view taken on the plane 5—5 of FIG. 2;

FIG. 6 is a sectional view taken on the plane 6—6 of FIG. 3 and on a larger scale and with the strap folded to form a closed loop; and FIG. 7 is a fragmentary longitudinal sectional view through an end fitting on the sprinkler hose.

The anchoring device of the present invention is generally adapted for use in anchoring a flexible sprinkler hose on the ground and the sprinkler hose may, for example, be of the type shown in the U.S. Pat. No. 2,730,404, to which reference is hereby made for a more complete illustration and description of the same. In general, the flexible sprinkler hoses include an elongated flexible tube 10 formed of a resilient and flexible plastic or the like, which tube has one or more channels extending lengthwise thereof and a plurality of perforations 11 at spaced locations along the tube to emit water in a multiplicity of fine streams or jets along the length of the hose. A rigid end fitting 13 is provided at one end of the sprinkler hose with an internally threaded nut 13a rotatably supported at one end for connecting the fitting 13 to a conventional garden hose (not shown). A similar rigid fitting 14 is commonly provided at the other end of the sprinkler hose, which fitting 14 has an externally threaded end 14a that is adapted for connection either to another sprinkler hose, or which can be closed as by an internally threaded cap 14b shown in section in FIG. 1. While any suitable arrangement can be utilized for attaching the ends of the flexible sprinkler hose to the end fittings 13 and 14, the usual arrangement is to utilize end fittings having inner and outer rigid tubular members such as shown at 13b and 13c in FIG. 7, which respectively overly the inner and outer sides of the end portions of the tube and which clamp the end portions of the tube therebetween to retain the ends of the sprinkler hose of the fittings and in sealed relation thereto.

The anchoring device 15 of the present invention can be applied at either or both ends of the sprinkler hose, as desired. In general, the anchoring device comprises a one-piece body of a resilient plastic material such as nylon or polypropylene of a type which, when formed in very thin sections, can provide a flexible hinge, and which, when formed in thicker sections becomes relatively stiff or rigid. The anchoring device 15 includes an intermediate body portion 16 which is adapted to underly the hose, an anchor pin portion 17 which is integrally connected at one end to the intermediate body portion by a thin flexible connecting portion 18 that forms an integral plastic hinge extending transversed to the anchor pin portion to allow swinging of the anchor pin portion between the position extending generally lengthwise of the hose on the position extending transversed to the hose, and a hose engaging portion 19 which is integral with the intermediate portion and which extends crosswise of the hose for attaching the anchoring device thereto.

The intermediate portion 16 is preferably in the form of a relatively flat strip having a cross-section sufficiently thick to make it relatively stiff or rigid and a length between the hose engaging portion 19 and the hinge 18 which is greater than the length of the end fittings such as 13, 14 on the sprinkler hose so that the hinge and anchor pin portions of the anchoring device are disposed beyond the end of the fitting, when the hose engaging portion 19 is clamped to the hose. The end fittings on the sprinkler hose commonly have a length of about 2 inches and the intermediate body portion 16 is accordingly formed so that the spacing between the hose engaging portion and the hinge is at least 2 inches and preferably about 2¼ inches.

The anchor pin portion 17 is preferably formed with a channel shaped configuration and is longitudinally tapered from the end adjacent the hinge 18 toward its distal or free end. As shown, the anchor pin portion 17 has longitudinally extending walls 17a integrally joined together along one edge and diverging in a direction crosswise of the anchor pin portion from the joined edge to provide a generally V-shaped cross-section, and the anchor pin tapers in a direction from the hinge end toward its free end to facilitate insertion of the anchor pin into the ground. An end wall 17b extends transversed to and is integrally joined with the longitudinal wall 17a at the end adjacent the hinge. The relatively diverging longitudinal walls 17a thus form an open sided channel with the open side arranged so as to face in a direction toward the hose engaging portion 19, when the anchor pin portion extends transversed to the sprinkler hose, as shown in solid lines in FIG. 1 and in phantom in FIG. 2. The open sided channel provides a wedge shaped pocket that traps earth or soil and provides improved resistance to pulling of the pin laterally through the ground due to tension on the sprinkler hose.

The hinge 18 is formed by providing a notch 18a in the integral connection between the intermediate body portion 16 and the anchor pin portion 17, which notch defines a thin flexible connecting portion that functions as an integral plastic hinge extending transverse to the longitudinal axis of the anchor pin. As shown, the longitudinal axis of the notch 18a parallels a plane through the open side of the anchor pin portion 17 and extends transverse to the longitudinal axis of the anchor pin portion.

The hose engaging portion 19 includes an elongated flexible strap portion 19a formed integral with the intermediate body portion and extending transversed thereto, with the cross-section of the strap portion being made sufficiently thin and narrow to enable bending of the strap into a closed loop to encircle the sprinkler hose. Provision is made for detachably connecting the free end of the strap to the intermediate body portion to retain the strap in a closed loop and this means includes an enlargement conveniently in the form of a semi-spherical ball 19b on the free end of the strap, and the keyhole type slot arrangement on the intermediate body portion 16 for detachably retaining the strap enlargement 19b. As shown, the keyhole slot arrangement is formed in a laterally enlarged end 16a on the intermediate body portion 16, which enlarged end has an opening 16b dimensioned to receive the enlarged end 19b on the strap and a slot 16c that intersects the opening 16b and which is dimensioned to receive the strap 19a while retaining the enlargement 19b on the strap. As best shown in FIG. 6, the laterally enlarged portion 16a of the intermediate body portion is also made sufficiently thick or deep as indicated at 16d to enclose the strap enlargement 19b when it is in the keyhole slot so that the sprinkler hose encircled by the strap does not interfere with insertion of the strap enlargement into the keyhole slot.

As will be seen, the strap 19a extends transverse to the longitudinal axis of the intermediate body portion 16 and also transverse to the longitudinal axis of the anchor pin, and the strap is foldable into a loop extending crosswise of the intermediate body portion for encircling the sprinkler hose. The length of the strap and the means for locking the free end of the strap to the intermediate body portion is preferably selected so that the loop formed by the strap has an inner perimeter somewhat less than the outer perimeter of the portion of the flexible sprinkler hose to be engaged thereby, so as to constrict the sprinkler hose below its normal cross-section. In addition, the thickened portion 16d projects into the sprinkler hose and, together with the strap, constricts the diameter of the sprinkler hose to a size less than the rigid inner tubular member in the adjacent sprinkler hose end fitting so as to transfer force to the inner rigid tubular member and inhibit pulling of the end fitting off the sprinkler hose when tensioning the sprinkler hose during laying of the same.

As previously described, the length of the intermediate body portion 16 between the hinge 18 and the hose engaging member 19 is made greater than the length of the end fittings 13, 14 so that the anchor pin portion 17 projects beyond the end of the sprinkler hose fittings. This facilitates insertion of the anchor pin portion by pressing downwardly on the end wall 17b and, moreover, enables the anchor pin portion to swing into a position extending lengthwise of the hose beyond the end of the end fitting, as shown in dotted lines in FIG. 1. As will be appreciated, the anchor pin, when positioned lengthwise of the sprinkler hose, does not impede pulling of the sprinkler hose over the ground to a new location. Thus, after the anchor pins are withdrawn from the ground, the sprinkler hose can easily be pulled from either end over the ground to a new location with the anchor pin at the trailing end of the hose extending lengthwise of the hose where it does not scar the turf or impede movement of the hose. On the other hand, since the hinge 18 is formed closely adjacent the plane of the under side of the sprinkler hose, the anchor pin can be inserted to its full depth into the ground to minimize the leverage on the anchor pin when tensioning the sprinkler hose during laying of the same.

As will be seen, the anchoring device formed of a flexible one-piece body of resilient plastic can be easily molded in a single molding operation and with relatively simple molding dies. For example, simple bi-portion molding dies can be used and arranged to have the parting line along the line P—P in FIG. 2.

The embodiments of the invention in which an exclusive property or privilege is claimed are defined as follows:

1. In combination with a flexible sprinkler hose having openings at spaced locations therealong for emitting water in a fine spray and a rigid end fitting on at least one end of the sprinkler hose, an anchoring device for anchoring the flexible sprinkler hose comprising, a one-piece body of resilient plastic material having an elongated intermediate body portion extending lengthwise of the hose in underlying relation to the rigid end fitting; an elongated anchor pin portion integrally connected at one end to one end of said intermediate body portion by a thin flexible connection portion forming a hinge extending transverse to said anchor pin portion at a location beyond the outer end of the end fitting to allow swinging of said anchor pin portion between a position extending generally lengthwise of said intermediate body portion and a position extending transverse to said intermediate body portion at one side of the latter; and a hose engaging portion integral with said intermediate body portion adjacent its other end and defining a loop extending in a plane crosswise of said elongated intermediate body portion at the other side thereof and encircling the flexible sprinkler hose adjacent the rigid end fitting for attaching the anchoring device thereto.

2. The combination of claim 1 wherein said elongated anchor pin portion is in the form of a channel and the open side of the channel is disposed substantially in a plane through the hinge axis so that the open side of the channel is substantially aligned with the elongated intermediate body portion when the anchor pin portion is positioned to extend lengthwise of the intermediate body portion in a direction away from said other end thereof and the channel opens in a direction facing toward said other end of the intermediate body portion when the anchor pin portion extends transverse to said intermediate body portion at said one side thereof.

3. The combination of claim 2 wherein said anchor pin portion tapers from said one end toward its distal end to facilitate insertion into the ground.

4. The combination of claim 2 wherein said anchor pin portion has an end wall at the end of said channel adjacent the hinge and said anchor pin portion tapers from said one end toward its distal end to provide a channel of decreasing width and depth.

5. The combination of claim 1 wherein said rigid end fitting comprises rigid inner and outer tubular members respectively overlying the inner and outer sides of the sprinkler hose, said hose engaging portion includes a flexible strap integrally joined at one end to said other end of said intermediate body portion and extending transverse thereto and bendable to form a loop encircling a flexible sprinkler hose, and interengaging means on said intermediate body portion and the free end of said flexible strap for detachably connecting the free end of the strap to the intermediate body portion, said intermediate body portion including a thickened head at said other end thereof projecting laterally from said other side of said intermediate body portion and inwardly of the loop for constricting the flexible hose into engagement with the end of the inner tubular member of the rigid end fitting.

6. An anchoring device for a flexible sprinkler hose according to claim 5 wherein said interengaging means includes an enlargement on said free end of said strap, an opening in said thickened head on the intermediate body portion shaped to receive said enlarged portion on the strap when inserted from said one side of the intermediate body portion, and a slot in said intermediate body portion intersecting said opening and extending crosswise of said intermediate body portion to allow passage of the strap therethrough while retaining said enlargement on the strap.

7. An anchoring device for anchoring a flexible sprinkler hose having a rigid end fitting comprising, a one-piece body of resilient plastic material having an elongated intermediate body portion; an elongated anchor pin portion integrally connected at one end thereof to one end of said intermediate body portion, the connection between said anchor pin portion and said body portion being notched to define a thin flex line therebetween forming a hinge extending transverse to said anchor pin portion to allow swinging of the anchor pin portion between a positon extending generally lengthwise of the intermediate body portion and a position extending transverse to the intermediate body portion at one side of the latter; and a flexible strap integrally connected at one end thereof to the other end of said intermediate body portion and extending in a direction transverse to the intermediate body portion, said strap being bendable to form a loop disposed in a plane transverse to said intermediate body portion at the other side of the latter for encircling a sprinkler hose, and interengaging means on said intermediate body portion and on the free end of said flexible strap for detachably connecting the free end of the strap to the intermediate body portion, said intermediate body portion including a thickened head at said other end thereof projecting laterally from said other side of the intermediate body portion and inwardly of the loop formed by said strap for constricting the hose into engagement with the rigid end fitting.

8. An anchoring device for a flexible sprinkler hose according to claim 7 wherein said interengaging means includes an enlarged end portion on the free end of said strap, an opening in said thickened head on the intermediate body portion shaped to receive said enlarged end portion on the strap when inserted from said one side of the intermediate body portion, and a slot in said intermediate body portion intersecting said opening, said thickened head having a cavity therein for receiving the enlarged end portion on the strap.

9. An anchoring device for a flexible sprinkler hose comprising, a one-piece body of resilient plastic material having an elongated intermediate body portion; an elongated anchor pin portion integrally connected at one end to one end of said intermediate body portion; and a hose engaging portion integral the other end of said intermediate body portion and adapted to engage a flexible sprinkler hose for attaching the anchoring device thereto, the connection between the anchor pin portion and the intermediate body portion being notched to define a thin flex line therebetween forming a hinge extending transverse to said anchor pin portion, said anchor pin portion being in the form of a channel open at one side and tapering in a direction from said one end toward its distal end and the open side of the channel being disposed substantially in a plane extending through the hinge axis so that the open side of the channel is substantially aligned with the elongated intermediate body portion when the anchor pin portion is positioned to extend lengthwise of the intermediate body portion in a direction away from said other end thereof, the anchor pin being movable to a position extending transverse to the intermediate body portion at one side of the latter with the open side of the channel facing in a direction toward said other end of the intermediate body portion.

10. An anchoring device for a flexible sprinkler hose according to claim 9 wherein said hose engaging portion comprises a head integral with said other end of said intermediate body portion and having a thickness greater than the thickness of the intermediate body portion to provide an abutment at the other end of the intermediate body portion projecting from the side of the latter opposite said one side, a flexible strap means integral with said cross head bendable to form a loop for encircling a flexible sprinkler hose, said strap having an integral enlargement on the distal end thereof and said head having a key-hole shaped opening therein for receiving the enlargement on the strap to detachably connect the free end of the strap to the head.

* * * * *